United States Patent [19]

Taniguchi et al.

[11] Patent Number: 4,728,973
[45] Date of Patent: Mar. 1, 1988

[54] CAMERA ON WHICH A FRONT CONVERTER CAN BE MOUNTED

[75] Inventors: Nobuyuki Taniguchi, Nishinomiya; Takeo Hoda, Kawachinagano; Yoshiaki Hata, Nishinomiya; Yoshinobu Kudo, Sakai; Manabu Inoue, Kobe; Hiroshi Ueda, Toyokawa, all of Japan

[73] Assignee: Minolta Camera Kabushiki Kaisha, Osaka, Japan

[21] Appl. No.: 56,688

[22] Filed: Jun. 2, 1987

[30] Foreign Application Priority Data

Jun. 4, 1986 [JP] Japan ................................. 61-129510

[51] Int. Cl.⁴ ...................... G03B 29/00; G03B 11/00
[52] U.S. Cl. ........................................ 354/79; 354/105; 354/286; 354/289.12; 354/295
[58] Field of Search ...................... 354/75, 76, 79, 21, 354/105, 106, 150, 195.1, 195.12, 286, 289.12, 295; 350/422

[56] References Cited

U.S. PATENT DOCUMENTS 3,490,844  1/1970  Sapp ............................... 354/106
4,583,831  4/1986  Harvey ........................... 354/106

FOREIGN PATENT DOCUMENTS 60-145428  9/1955  Japan .
54-26721   2/1979  Japan .

Primary Examiner—L. T. Hix
Assistant Examiner—David M. Gray
Attorney, Agent, or Firm—Burns, Doane, Swecker & Mathis

[57] ABSTRACT

A camera on which a front converter can be mounted and wherein a picture image of a high quality over an entire picture plane can be obtained and an aperture of a front converter can be reduced while a photographing magnification of the camera can be increased without the necessity of much expense. The camera comprises trimming designating means for designating a trimming condition in which an area smaller than a normal photograph area is printed. Upon operation of the trimming designating means, encoding means operates to encode a trimming signal on a film so as to designate the trimming condition upon printing from the film. When a front converter is mounted on the camera, judging means detects this, and controlling means thereupon operates the trimming designating means to designate the trimming condition.

2 Claims, 13 Drawing Figures

CAMERA ON WHICH A FRONT CONVERTER CAN BE MOUNTED

BACKGROUND OF THE INVENTION

1. Field of the Invention

This invention relates to a camera, and more particularly to a camera on which a front converter is mounted in front of a photographing lens in order to elongate a composite focal length of a photographing optical system of the camera.

2. Description of the Prior Art

Various types of front converters are conventionally known which are adapted to be mounted on a photographing lens of a camera for changing an angular field of view of the camera. However, the conventional front converters commonly have drawbacks that (1) they are low in image forming performance of the edge of a picture plane; (2) they have such a large aperture that the compactness of a camera may be deteriorated; and (3) they can attain only a photographing magnification of 1.25 to 1.5 times or so. An attempt to resolve the problems actually required high technique and much expense in designing a front converter lens. Still, a satisfactory result was not attained.

This originates in the fact that even when a photograph is to be taken by a camera on which such a conventional front converter is mounted, a good image of an object for photographing must be formed over an entire photographing picture plane.

SUMMARY OF THE INVENTION

Accordingly, it is an object of the present invention to provide a camera wherein a picture image of a high quality over and around an entire picture plane can be obtained and an aperture of a front converter can be reduced while a photographing magnification of the camera can be increased without the necessity of much expense, eliminating such drawbacks of the prior art arrangements as described above.

In order to attain the object, according to the present invention, a camera of the type which can designate a trimming condition in which an area smaller than an ordinary photograph area is printed, such as a camera disclosed in Japanese patent laid-open No. 54-26721, is made use of and is characterized in that it comprises judging means for judging whether or not a front converter is mounted on said camera, trimming designating means for designating a trimming condition in which an area smaller than a normal photograph area is printed, encoding means operable in response to operation of said trimming designating means for encoding a trimming signal indicative of the trimming condition on a film, and controlling means operable when said judging means judges that a front converter is mounted on said camera for operating said trimming designating means to designate the trimming condition.

Accordingly, if a front converter is mounted on the camera, normally the trimming condition is designated and a trimming signal indicative of the trimming condition is encoded on a film. Consequently, a print of a high magnification can be obtained by a combination of a magnification of the front converter itself and a magnification by the trimming photographing. Accordingly, without increasing the magnification of the front converter itself, a similar print as is obtained with a high photographing magnification can be obtained. Besides, since the aberration correcting performance of the front converter may be such that an image of a high quality must only be obtained within an area to be later printed, the front converter can be simplified in construction and can be reduced in aperture. Consequently, the front converter can be reduced in weight and size.

The above and other objects, features and advantages of the present invention will become apparent from the following description and the appended claims, taken in conjunction with the accompanying drawings.

BRIEF DESCRIPTION OF THE DRAWINGS

FIGS. 10a, 10b, 11 and 12 are flow charts illustrating operation of a microcomputer incorporated in the camera of FIG. 3.

DETAILED DESCRIPTION OF THE PREFERRED EMBODIMENTS

Figure 1:
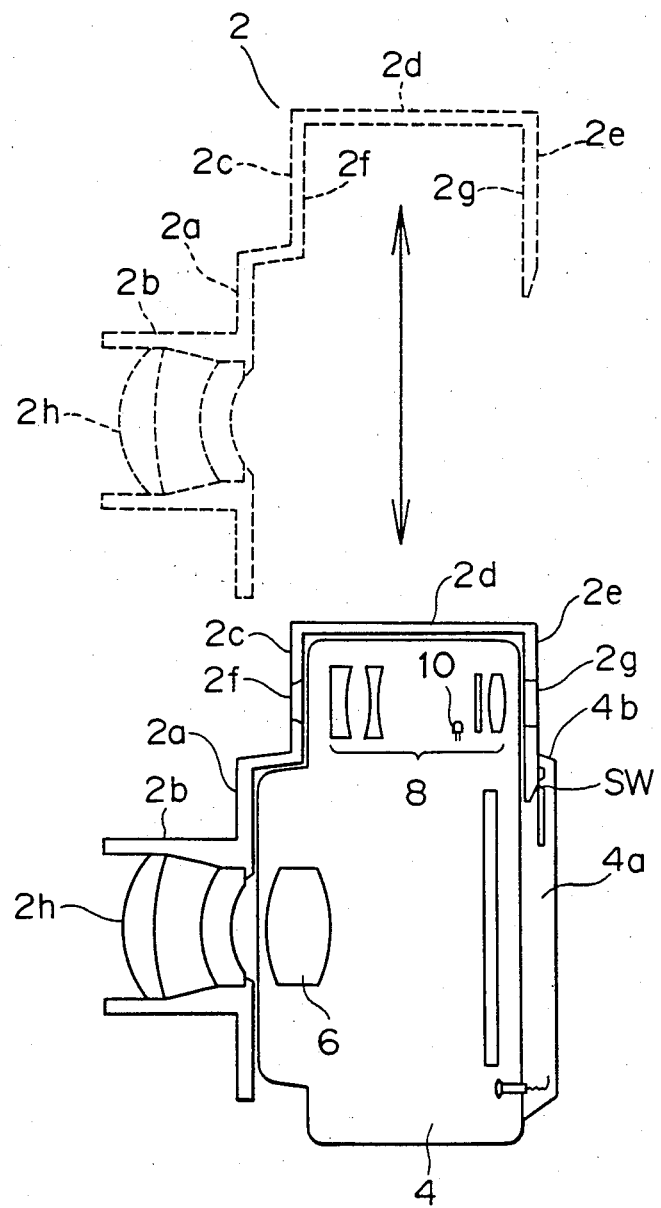
FIG. 1 is an illustrative vertical sectional view of a camera of an embodiment of the present invention on which a front converter is mounted.
Figure 2:
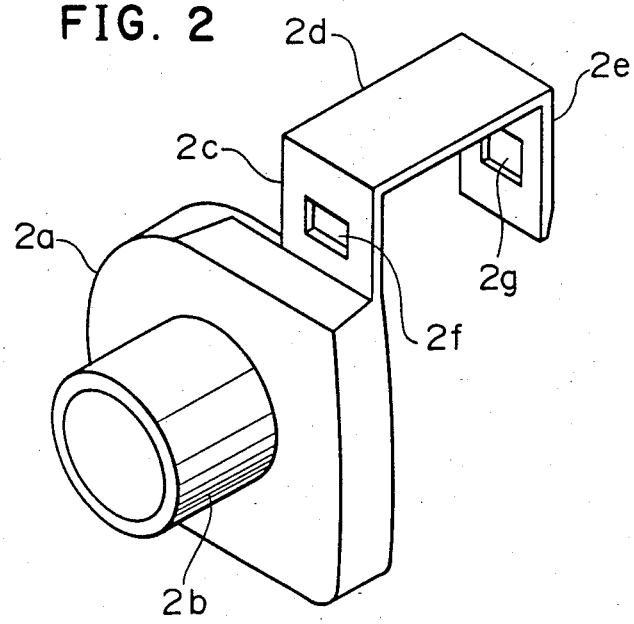
FIG. 2 is a perspective view of the front converter of FIG. 1.

Referring first to FIG. 1, there is shown a camera of an embodiment of the present invention on which a front converter is mounted. The front converter generally denoted at 2 is constructed such that it may be mounted on a body 4 of the camera as shown in solid lines and removed from the camera body 4 as shown in broken lines in FIG. 1. Referring also to FIG. 2, the front converter 2 has a front frame portion 2a which covers a lens barrel of the camera when it is mounted on the camera body 4, a converter lens barrel 2b extending forwardly from the front frame portion 2a, and a view field frame forming portion 2c extending upwardly from the front frame portion 2a. The converter lens barrel 2b has a front converter lens system 2h supported therein, and when the front converter 2 is mounted on the camera, the front converter lens system 2h is positioned in front of a photographing lens 6 of the camera described hereinbelow. Meanwhile, the view field frame forming portion 2c of the front converter 2 has an opening 2f perforated therein which serves as a view field frame indicating a range of photographing when trimming photographing is to be effected with the front converter 2 mounted on the camera body 4. A coupling portion 2d extends rearwardly from the view field frame forming portion 2c, and an eyepiece frame forming portion 2e extends downwardly from a rear end of the coupling portion 2d. An opening 2g serving as an eyepiece frame is perforated in the eyepiece frame forming portion 2e. The opening 2g has a size sufficiently greater than an area of a light path of the view finder of the camera when the front converter 2 is mounted on the camera.

Referring back to FIG. 1, the camera includes the photographing lens 6 and a view finder optical system 8. When the front converter 2 is mounted onto the camera body 4, an end of the eyepiece frame forming portion 2e thereof is introduced into a slit 4b formed in the rear cover 4a of the camera and presses against a detecting switch Sw which will be hereinafter described to switch the same. Thereupon, a light emitting diode (LED) 10 incorporated in the view finder optical system 8 is lit to make an indication that a trimming photographing mode is designated. Here, the view finder optical system 8 may be a view finder optical system of the Albada type wherein frames of fields of view for a non-trimming mode and a trimming mode and focus frame marks indicative of ranges of fields of view may selectively be displayed within a field of view of the view finder.

Figure 3:
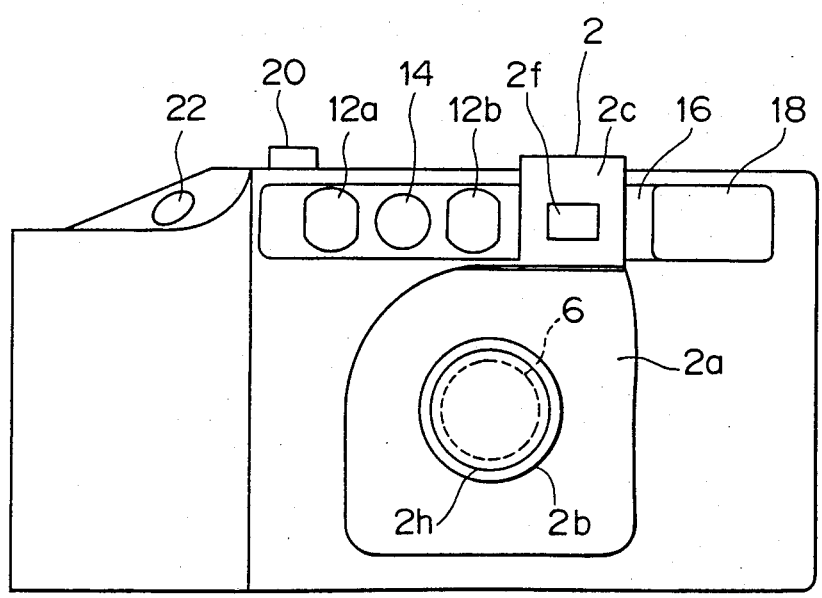
FIG. 3 is a front elevational view of the camera of FIG. 1 on which the front converter is mounted.

Referring now to FIG. 3, there is shown a front elevational view of the camera body 4 on which the front converter 2 is mounted. The camera body 4 has a pair of light measuring windows 12a, 12b for admitting light to be measured for automatic focusing, another light measuring window 14 for admitting light to be measured for automatic exposure control, a view finder window 16, and a flash light projecting portion 18. The camera body 4 further has a trimming mode selection button 20 for manually selecting whether trimming photographing is to be performed or not, and a shutter release button 22.

With the construction of the camera body 4 described just above, when the front converter 2 is mounted on the camera body 4, a photographer will have a photographing range defined by the field of view of the view finder which is delineated by the view field frame 2f of the front converter 2. In this instance, a lighting light path of the optical system of the Albada type is interrupted by the view field frame forming portion 2c of the front converter 2 so that the view field frames for the non-trimming mode and the trimming mode will not be observed by the photographer, which will improve the visibility of the view finder of the camera. On the other hand, the focus frame marks indicated by the optical system of the Albada type remain in clear visibility because lighting for the focus frame marks can be effected via the opening 2f of the view field frame forming portion 2c of the front converter 2.

Meanwhile, when the front converter 2 is mounted onto the camera body 4, the lower end of the eyepiece frame forming portion 2e thereof is introduced into the slit 4b in the rear cover 4a of the camera thereby to switch the detecting switch S2 within the rear cover 4a. As the switch Sw is switched, when photographing is actually effected, the camera is put into the trimming mode without fail so that a trimming signal is encoded on a film whether the trimming mode or the non-trimming mode is selected on the camera body 4 side. Such information of the detecting switch Sw is transmitted to the camera body 4 side by way of a signal pin.

Figure 4:
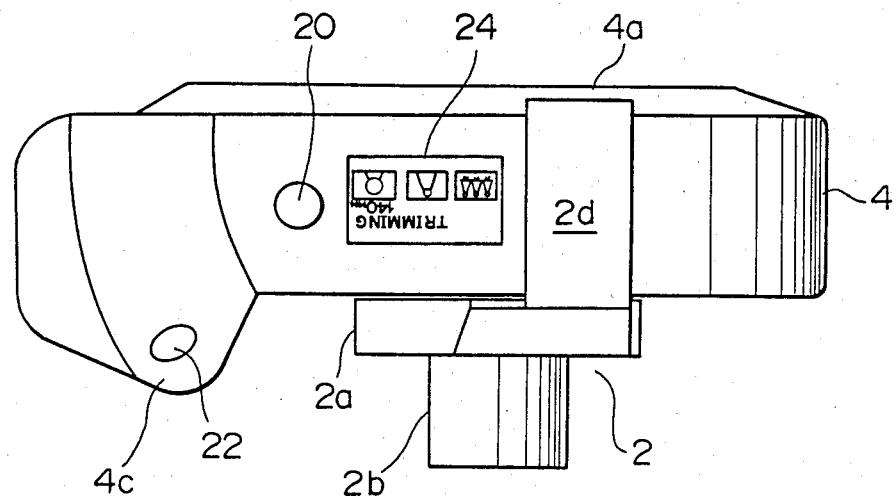
FIG. 4 is a top plan view of the camera of FIG. 3.

Referring now to FIG. 4, there is shown a top plan view of the camera body 4 on which the front converter 2 is mounted. A liquid crystal display device 24 for displaying a photographing mode and the trimming mode selection button 20 mentioned above are located on the top of the camera body 4. The trimming mode selection button 20 may be manually operated to select the trimming mode or the non-trimming mode. Meanwhile, the shutter release button 22 is located at an upper portion of a grip 4c which is formed in an integral relationship on the camera body 4.

Figure 5:
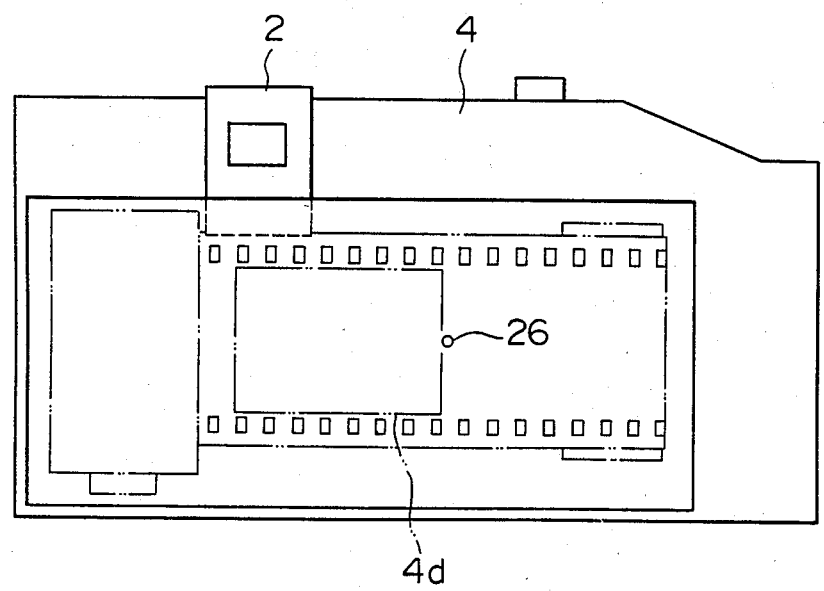
FIG. 5 is a rear elevational view of the camera of FIG. 3 with a rear cover opened.

Referring now to FIG. 5, there is shown a rear elevational view of the camera body 4 on which the front converter 2 is mounted with the rear cover 4a opened.

A trimming signal encoding device 26 is located adjacent a side of a picture frame 4d of the camera body 4 and encodes, where the trimming mode is designated, a trimming signal on a film upon photographing.

Figure 6:
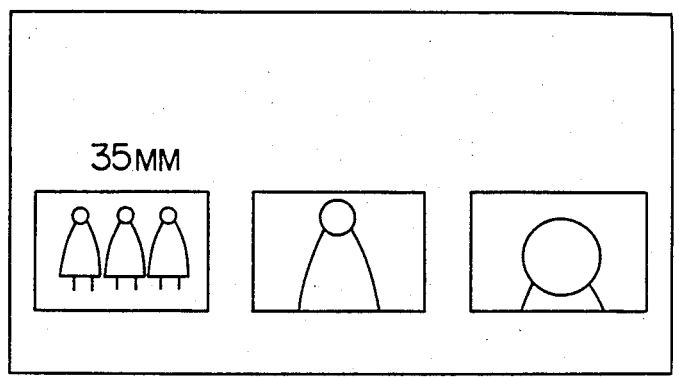
FIGS. 6 to 8 are illustrations showing different display patterns of a liquid crystal display device of the camera of FIG. 3.
Figure 7:
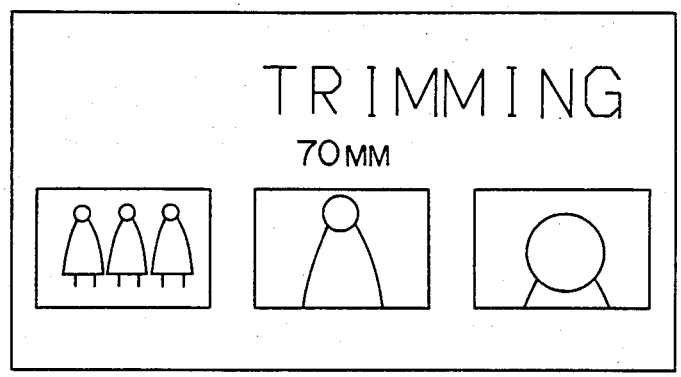
Figure 8:
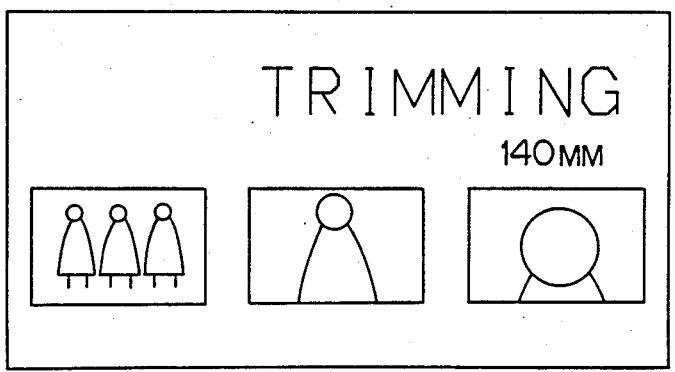

FIGS. 6 to 8 show different display patterns of the liquid crystal display device 24 on the top of the camera as shown in FIG. 4.

In particular, FIG. 6 shows a display pattern in the non-trimming mode of the camera wherein characters "35 MM" representing a focal length of the photographing lens of the camera by itself are displayed as a focal length of 35 mm for photographing. FIG. 7 shows another display pattern of the liquid crystal display device 24 when the trimming mode is designated by manual operation of the trimming mode selecting button 20 but the front converter 2 is not mounted on the camera body 4. In this instance, characters "70 MM" are displayed on the liquid crystal display device 24 because the distance "70 mm" which is obtained from an equation $35 \times (1/\sqrt{\frac{1}{4}})$ makes a substantial focal length of the photographing lens to a user of the camera due to the fact that in this condition of the camera a trimming signal is encoded on a film upon photographing so that a central portion of a picture having an area of one fourth of the entire area of the picture will later be printed in an expanded scale. At the same time, a word "TRIMMING" is also displayed in order to indicate that the camera is in the trimming mode. FIG. 8 shows a further display pattern of the liquid crystal display device 24 when the front converter 2 is mounted on the camera body 4. In the embodiment, the magnification of the front converter 2 itself is 2X, and consequently the substantial focal length of the photographing lens to a camera user is $70 \times 2 = 140$ mm. Thus, a word "140 MM" indicating the substantial focal length 140 mm is displayed on the liquid crystal display device 24. Further, when the front converter 2 is mounted on the camera body 4, the camera is compulsorily put into the trimming mode whichever of the trimming mode and the non-trimming mode was selected before mounting of the front converter 2. Accordingly, the word "TRIMMING" is also displayed on the liquid crystal display device 24.

In the display patterns of the liquid crystal display device 24 shown in FIGS. 6 to 8, three pictures which always remain displayed indicate visually how the magnitude of an object relatively varies on a print as a result of change-over of a photographing mode and mounting or removal of the front converter.

Figure 9:
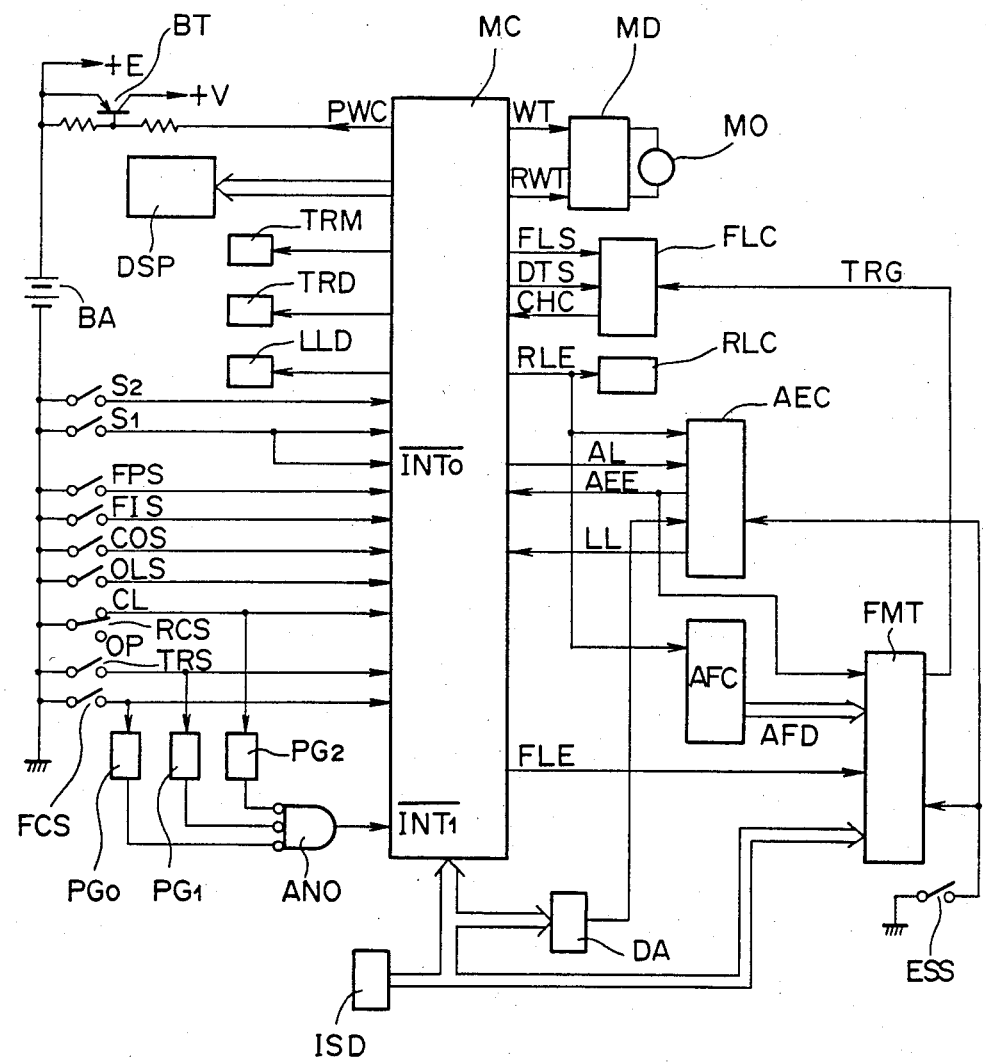
FIG. 9 is a circuit diagram showing an electric circuit of the camera of FIG. 3.

Referring now to FIG. 9, an electric circuit incorporated in the camera body 4 of the present embodiment is shown. The electric circuit shown includes a photometry switch $S_1$ which turns on when the shutter release button 22 is depressed to a first position or depth, a release switch $S_2$ which turns on when the shutter release button 22 is depressed to a second position or depth farther than the first position, a one frame switch FPS which turns on when feeding of a film by one frame distance is completed, an overload detecting switch OLS which turns on when an overload is applied to a film winding device because the film cannot be wound up any more due to, for example, arrival of a final end of the film during winding, and a counter switch COS. Here, a film counter is reset to a position S when the rear cover 4a of the camera is opened and is then enabled to count a film frame when the rear cover 4a is closed again. When enabled, the film counter increments like S→.→.→1→2 . . . each time the film is wound by one frame distance. The counter switch COS remains off until the count value of the film counter reaches "1" from "S", and then it turns on. Here, the camera is constructed such that it may effect preliminary feeding of a film until the one frame switch FPS turns on after the film has been wound up to the predetermined initial position after closing of the rear cover 4a.

The electric circuit of the camera further includes a film detecting switch FIS which is normally on but is turned off when a film is loaded into the camera. While a film is being rewound, the state of the film detecting switch FIS is continuously checked, and when it is judged that the film detecting switch FIS is turned on, the film rewinding operation is stopped. The electric circuit further includes a rear cover switch RCS which is connected to a terminal CL when the rear cover 4a is closed but is disconnected from the terminal CL and connected to another terminal OP when the rear cover 4a is opened. When the switch RCS is switched from the terminal CL to the other terminal OP or vice versa, a pulse is produced from a pulse generator $PG_2$ and transmitted via a negated AND circuit $AN_0$ to an interrupt terminal $INT_1$ of a microcomputer MC which is provided for controlling various operations of the camera. Another interrupt terminal $INT_0$ is connected to the photometry switch $S_1$ described hereinabove.

The electric circuit of the camera further includes a light source TRM for the trimming signal encoder 26, and a display device TRD for displaying within the view finder that the trimming mode is designated. The display device TRD includes the aforementioned LED 10. Another display device LLD is provide for making an indication of warning when shutter release is locked because the brightness of an object for photographing is lower than a predetermined level or else a capacitor for driving a flash device is not sufficiently charged upon photographing using the flash device. A trimming switch TRS is operated in response to the trimming mode selection button 20, and when the trimming switch TRS is switched from an open to a closed position, a pulse is produced from a pulse generator $PG_1$ and is transmitted via the negated AND circuit $AN_0$ to the interrupt terminal $INT_1$ of the microcomputer MC.

A front converter detecting switch FCS is turned on when the front converter 2 is mounted on the camera body 4 and is turned off when the front converter 2 is removed from the camera body 4. The front converter detecting switch FCS corresponds to the detecting switch Sw of FIG. 1. When the front converter detecting switch FCS is switched from a closed to an open position or vice versa, a pulse is produced from the pulse generator $PG_0$ and transmitted to the interrupt terminal $INT_1$ of the microcomputer MC via the negated AND circuit $AN_0$. A further display device DSP corresponds to the liquid crystal display device 24 of FIG. 4 and is located on the top of the camera for displaying a selected one of the display patterns of FIGS. 6, 7 and 8 in accordance with data received from the microcomputer MC.

A motor driving circuit MD is provided for driving a film feeding motor MO. The motor MO is thus controlled by the motor driving circuit MD such that when an output terminal WT of the microcomputer MC is changed from a "High" to a "Low" level, it is rotated in a forward direction to wind a film, but when another output terminal RWT of the microcomputer MC is changed from the "High" to the "Low" level, it is rotated in a reverse direction to rewind a film. When both of the output terminals WT, RWT are at the "Low" level, the motor MO is short-circuited across opposite ends thereof for a predetermined interval of time so that rotation thereof may be braked.

A flash circuit FLC initiates a boosting operation for charging a flash capacitor therein when an output terminal FLS of the microcomputer MC is changed from the "High" to the "Low" level, and when another output terminal DTS of the microcomputer MC is changed from the "High" to the "Low" level, the flash circuit FLC initiates an operation to detect a charged voltage of the flash capacitor. When the charged voltage of the flash capacitor exceeds a predetermined level, input to an input terminal CHC of the microcomputer MC from the flash circuit FLC is changed from the "Low" to the "High" level. After then, the flash device FLC will be caused to emit light in response to a pulse signal delivered thereto from an output terminal TRG of a flashmatic timer FMT which will be hereinafter described.

A release circuit RLC is provided for canceling an arresting condition of an arresting mechanism which is in turn provided for arresting the photographing lens 6 from movement for focusing. The release circuit RLC operates to allow the photographing lens 6 to start its movement when an output terminal RLE of the microcomputer MC is changed over from the "High" to the "Low" level. An automatic exposure controlling circuit AEC starts a light measuring and calculating operation when an output terminal PWC of the microcomputer MC is changed over from the "High" to the "Low" level to turn on a power supply transistor BT connected to a power source battery BA so that the power supply transistor BT starts supply of power over a power supply line +V. The automatic exposure controlling circuit AEC thus calculates out an exposure value Ev from information regarding a film sensitivity Sv delivered from a digital to analog converter DA which will be hereinafter described and also from information regarding a brightness Bv of an object obtained as a result of a light measuring operation (here, Ev=Bv+Sv). Then, at a point of time when a further output terminal AL of the microcomputer MC is changed over from the "High" to the "Low" level, the exposure value Ev is locked, and then when the exposure value Ev is lower than a predetermined value, input to an input terminal LL of the microcomputer MC from the automatic exposure controlling circuit AEC is changed over to the "Low" level. Then, when the movement of the photographing lens 6 for focusing is completed and the shutter is caused to start its opening movement via a mechanical connection therebetween, a switch ESS is turned on, and a signal indicative of an exposure value Ev corresponding to the opening of the shutter is produced from a slide rheostat not shown. After turning on of the switch ESS, the exposure value Ev locked for automatic exposure and the exposure value Ev from the slide rheostat are compared with each other, and when they coincide with each other, a shutter closing operation starting magnet is turned off to start a shutter closing operation. In response to starting of such a shutter closing operation, a pulse of the "Low" level is delivered from another output terminal AEE of the automatic exposure controlling circuit AEC to the microcomputer MC. In the present embodiment, the shutter is of the type which serves also as an aperture diaphragm, and combinations of aperture opening diameters and exposure times are fixed in accordance with a predetermined program. It is to be noted here that the shutter closing operation starting magnet is turned on when the output terminal RLE of the microcomputer MC is changed over from the "High" to the "Low" level.

An automatic focusing circuit AFC begins to receive supply of power when the aforementioned power supply transistor BT is turned on. Then, the automatic focusing circuit AFC first performs a distance measuring operation and stores therein distance data obtained as a result of such a distance measuring operation and indicative of a distance to an object. The distance data is also delivered from an output terminal AFD of the automatic focusing circuit AFC to the flashmatic timer FMT. Consequently, the release circuit RLC is rendered operative so that the photographing lens 6 is released from its arrested condition and begins its movement. Here, a lens movement stopping magnet for stopping the photographing lens 6 at a focused position was turned on when the output terminal RLE of the microcomputer MC was changed over from the "High" to the "Low" level. As the photographing lens 6 is moved for focusing, a pulse train is produced from an encoder not shown, and such pulses are counted within the automatic focusing circuit AFC. Then, when the count value comes to coincide with the distance data stored in the automatic focusing circuit AFC, the lens movement stopping magnet is turned off so that the lens is arrested from movement at a position corresponding to the distance data.

A film sensitivity data reading circuit ISD reads data recorder on a code plate on a film container and indicative of a film sensitivity and delivers the data as information regarding the film sensitivity Sv. It is to be noted that either where no film container is loaded in the camera or where a film container having no code plate thereon is loaded in the camera, predetermined fixed film sensitivity data (for example, ISO=100) is delivered from the film sensitivity data reading circuit ISD. The delivered data is transmitted to the microcomputer MC and the flashmatic timer FMT. The data is also transmitted to the automatic exposure controlling circuit AEC as an analog signal via the digital to analog converter DA.

The flashmatic timer FMT decodes, in response to distance data received from the automatic focusing circuit AFC and also to film sensitivity data received from the film sensitivity data reading circuit ISD, timer data for indicating a timing at which the flash device is to emit light. The time to the timing corresponds to an interval of time from a point of time at which the opening operation of the shutter is started (that is, turning on of the switch ESS) to another point of time at which the aperture opening diameter of the shutter reaches a value at which appropriate exposure is obtained by emission of flash light. It is to be noted that, in the present embodiment, in case an object is located remotely and accordingly an appropriate aperture value is not reached even when the aperture opening diameter reaches that of the fully open aperture, the shutter undergoes limitation for a long time of seconds and begins its closing movement when the fully open aperture is reached. Then, when the flashmatic timer FMT receives the signal indicative of starting of such a shutter closing operation from the output terminal AEE of the automatic exposure controlling circuit AEC, it delivers from the output terminal TRG thereof a light emitting pulse to compulsorily cause the flash device to emit light. It is to be noted that a light emitting pulse is delivered from the output terminal TRG of the flashmatic timer FMT only when an output terminal FLE of the microcomputer MC is at the "Low" level.

Now, operation of the microcomputer MC in the present embodiment will be described with reference to flow charts of FIGS. 10a, 10b, and 11 and 12. In the flow charts, reference symbol TRF represents a trimming flag which is set to "1" when the trimming mode is designated by way of the trimming switch TRS but is reset to "0" when a normal mode in which no trimming photographing is effected is selected, and FCF represents a front converter mounting detection flag which is set to "1" when the front converter 2 is mounted on the camera body 4 but is reset to "0" when the front converter 2 is removed.

Figure 10A:
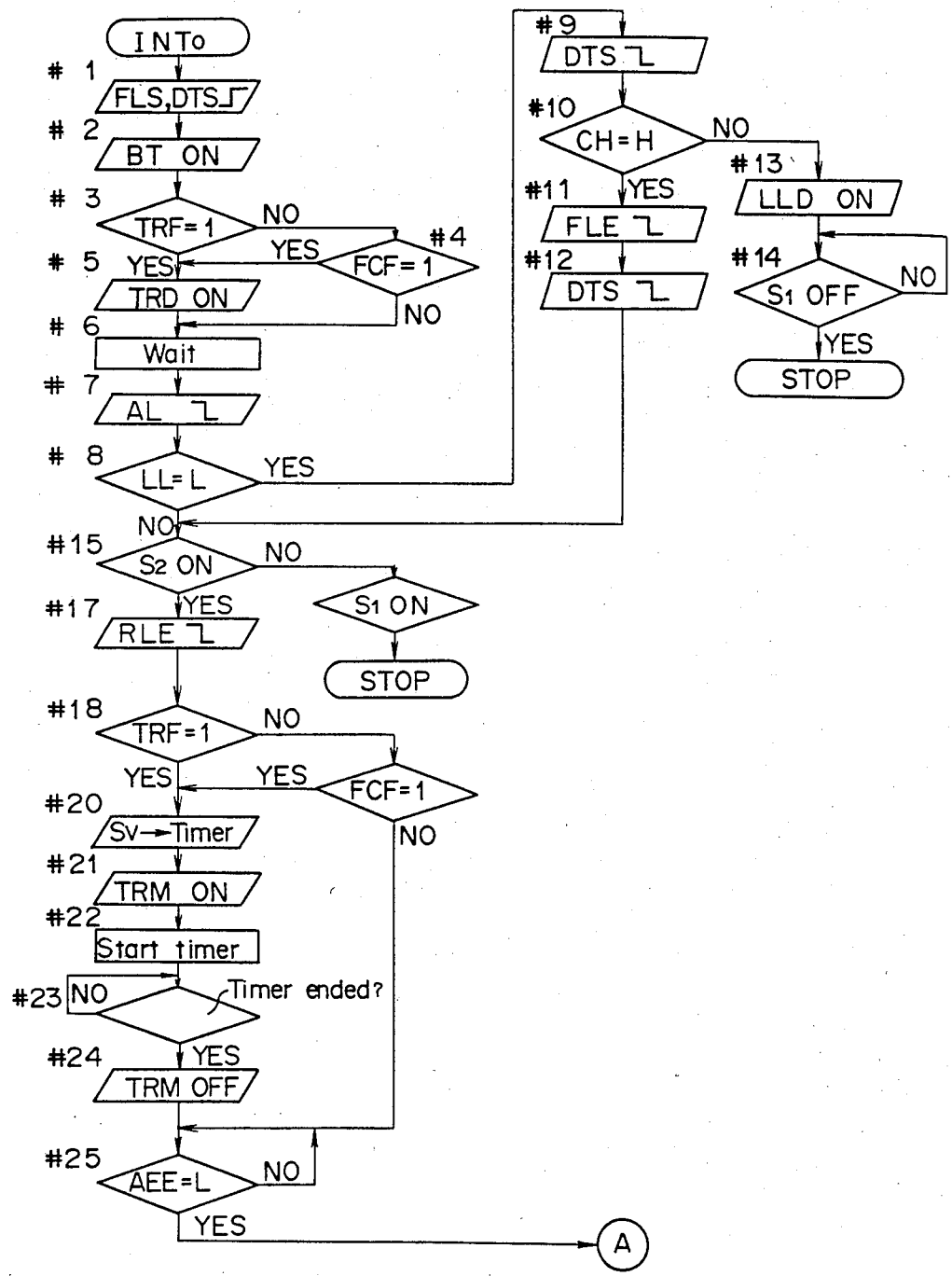
Figure 10B:
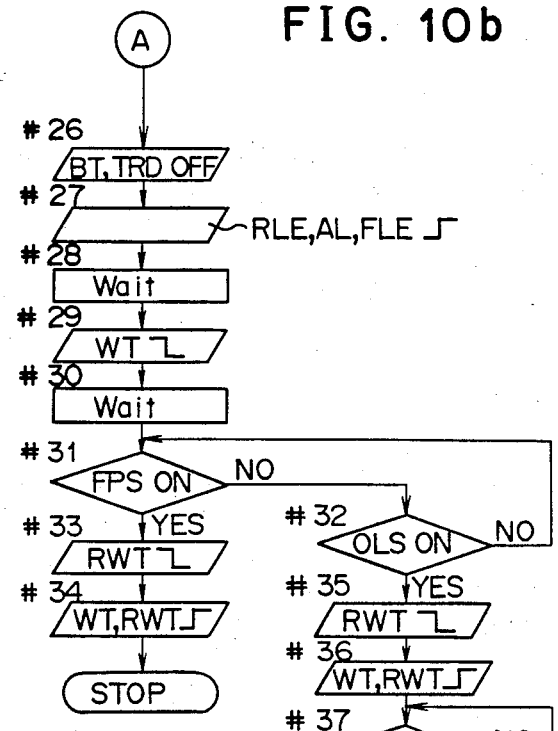

FIGS. 10a and 10b are flow charts illustrating operation of the microcomputer MC when the photometry switch S₁ is turned on while FIG. 11 is a flow chart illustrating operation of the microcomputer MC when the rear cover switch RCS is switched from the terminal CL to the terminal OP or vice versa or when the front converter detection switch FCS is switched from the open to the closed position or vice versa or otherwise when the trimming switch TRS is changed from the open to the closed position.

Referring first to FIG. 10a, the routine of the flow chart shown is entered when the photometry switch S₁ is turned on. In the routine, at first at step #1, the microcomputer MC changes both of the output terminals FLS, DTS thereof to the "High" level to stop operation of the flash circuit FLC so that if the turning on of the photometry switch S₁ occurs during boosting operation of the flash circuit FLC, the flash circuit FLC may not further continue its boosting operation. Then at step #2, the output terminal PWC of the microcomputer MC is changed to the "Low" level to turn the power supply transistor BT on to make supply of power available. Then at step #3, it is judged whether or not the trimming flag TRF is "1", and at step #4, it is judged whether or not the front converter mounting detection flag FCF is "1", and in case either one of the flags TRF and FCF is "1", then the display device TRD is turned on at step #5 to indicate that the trimming mode is designated. Subsequently at step #6, the microcomputer MC waits for a predetermined interval of time sufficient for a photometry circuit included in the automatic exposure controlling circuit AEC to become stabilized in operation and for the automatic focusing circuit AFC to complete a distance measuring operation, and then changes the output terminal AL thereof to the "Low" level in order to lock an exposure value Ev at the time. Then at step #8, the microcomputer MC judges whether or not the output terminal LL of the automatic exposure controlling circuit AEC is at the "Low" level in order to determine whether or not the locked exposure value Ev is lower than the predetermined level, and in case the output terminal LL is at the "Low" level and accordingly the exposure value Ev is lower than the predetermined level, then the program advances to step #9, or on the contrary in case the output terminal LL is at the "High" level and accordingly the exposure value Ev is not lower than the predetermined level, the program advances to step #15.

At step #9, the output terminal DTS of the microcomputer MC is changed to the "Low" level to cause the flash circuit FLC to detect a current state of the flash capacitor being charged, and at subsequent step #10, it is judged whether or not the flash capacitor is in a sufficiently charged up state. Thus, in case the flash capacitor has been sufficiently charged up and consequently the output terminal CHC of the flash circuit FLC presents the "High" level, the microcomputer MC changes at step #11 the output terminal FLE thereof to the "Low" level to enable the flashmatic timer FMT to thereafter deliver a light emitting pulse from its output terminal TRG and then changes at step #12 the output terminal DTS thereof to the "High" level to stop the charged condition detecting operation of the flash circuit FLC, whereafter the microcomputer MC advances the program to step #15.

On the other hand, in case the output terminal CHC of the flash circuit FLC is at the "Low" level and accordingly the flash capacitor is not yet in the fully charged up state at step #10, then the microcomputer MC turns on the release lock warning display device LLD at step #13 and then waits at step #14 until the photometry switch $S_1$ is turned off, whereafter the program advances to a stop routine which will be hereinafter described.

At step #15, it is checked whether or not the release switch $S_2$ is on, and at step #16, it is checked whether or not the photometry switch $S_1$ is off. A loop including the steps #15 and #16 is repetitively followed either until the release switch $S_2$ is turned on or until the photometry switch $S_1$ is turned off. In the latter case, the microcomputer MC subsequently enters the stop routine. But in the former case, the program advances to step #17 at which the microcomputer MC changes the output terminal RLE thereof to the "Low" level to activate the release circuit RLC to start movement of the lens of the camera. Then, at the step #18, the trimming flag TRF is checked, and at step #19, the front converter mounting detecting flag FCF is checked. Thus, in case either one of the trimming flag TRF and the front converter mounting detection flag FCF is "1", the program advances to step #20 in order to encode a trimming signal on a film.

In particular, at first at step #20, a built-in timer of the microcomputer MC is set to a value corresponding to information of the film sensitivity Sv, and then the trimming signal encoding light source TRM is turned on at step #21 whereafter the timer is started at step #22. Then at step #23, the microcomputer MC waits until operation of the timer comes to an end, and then at step #24, the trimming signal encoding light source TRM is turned off, thereby completing encoding of a trimming signal on a film. After then, the program advances to step #25.

To the contrary, in case it is judged at steps #18 and #19 that both of the trimming flag TRF and the front converter mounting detection flag FCF are "0", the trimming signal encoding sequence including the steps #20 to #24 is by-passed, and the program immediately advances to step #25.

At step #25, the microcomputer MC waits until the output terminal AEE of the automatic exposure controlling circuit AEC is changed to the "Low" level and consequently the microcomputer MC receives a signal indicating that the shutter has been closed. Upon reception of such a signal, the microcomputer MC advances the program to step #26.

Referring now to FIG. 10b, the microcomputer MC controls, at step #26, the power supply transistor BT and the trimming mode display device TRD to turn off to stop their operation, and then changes, at step #27, the output terminals RLE, AL and FLE thereof to the "High" level to stop operation of the automatic exposure controlling circuit AEC and the flashmatic timer FMT. Then at step #28, the microcomputer MC waits for a predetermined interval of time sufficient to complete the closing operation of the shutter, and thereafter changes, at step #29, the output terminal WT thereof to the "Low" level in order to start a film winding operation. After starting of a film winding operation at step #29, the microcomputer MC waits for another predetermined interval of time sufficient for the one frame switch FPS to be turned off and then waits until either the one frame switch FPS or the overload detecting switch OLS is turned on at step #31 or #32, respectively. Then, if the one frame switch FPS is turned on, this means that the film winding operation has been completed regularly, and accordingly the microcomputer MC advances the program to step #33 at which it changes the output terminal RWT thereof to the "Low" level together with the output terminal WT in order to brake rotation of the motor MO. Then at step #34, the microcomputer MC changes both of the output terminals RWT, WT thereof to the "High" level to stop operation of the motor driving circuit MD, whereafter it enters the stop routine.

On the other hand, in case the overload detecting switch OLS is turned on at step #32, this means that an overload is applied due to excessive tension of a film because the film is at a final frame position and cannot be wound any more. Thus, the microcomputer MC now executes a sequence of operations beginning with step #35. At step #35, the output terminal RWT of the microcomputer MC is changed to the "Low" level together with the output terminal WT in order to brake rotation of the motor MO, and then at step #36, the output terminals RWT, WT are both changed to the "High" level to stop operation of the motor driving circuit MD to stop the motor MO. Subsequently at step #37, the microcomputer MC waits until the photometry switch $S_1$ is turned off, and then at step #38, the output terminal RWT of the microcomputer MC is changed to the "Low" level in order to rotate the motor MO in the reverse direction to start rewinding of a film. Then at step #39, the microcomputer MC waits until the film detecting switch FIS is turned on. The film detecting switch FIS turns on when the film disappears from a position adjacent which the film detecting switch FIS is located. Thus, after turning on of the switch FIS, the microcomputer MC changes at step #40 the output terminal WT thereof to the "Low" level together with the output terminal RWT in order to brake the motor MO against rotation, and then at step #41, the output terminals RWT, WT are both changed to the "High" level in order to stop the motor MO to stop the film rewinding operation, whereafter the microcomputer MC enters the stop routine.

Figure 12:
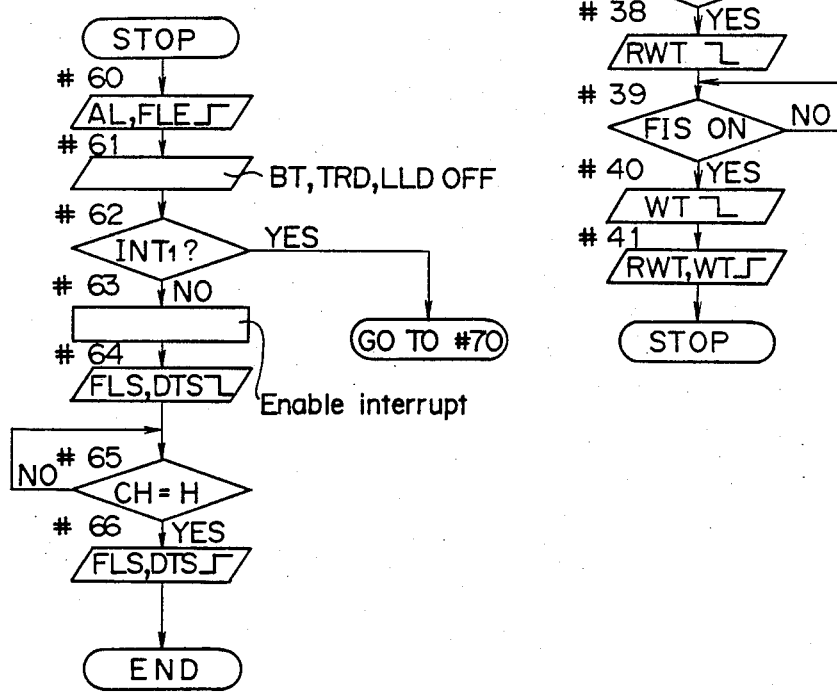

Now, the stop routine will be described with reference to a flow chart of FIG. 12. In the stop routine shown, at first at step #60, the output terminals AL, FLE of the microcomputer MC are both changed to the "High" level in order to cancel locking of the exposure value Ev and inhibit delivery of a light emitting pulse from the output terminal TRG of the flashmatic timer FMT. Then at step #61, the power supply transistor BT, trimming mode display device TRD, and release lock warning display device LLD are turned off. Subsequently at step #62, the microcomputer MC judges whether or not an interrupt signal is received at the interrupt terminal INT₁ thereof, and in case an interrupt signal is received, the program advances to step #70, but on the contrary if no interrupt signal is received, the microcomputer MC enables such interrupt at step #63, and then at step #64, changes the output terminals FLS, FLC thereof to the "Low" level to cause the flash circuit FLC to perform a boosting operation and a charging completion detecting operation.

Subsequently at step #65, the microcomputer MC waits completion of charging up of the flash capacitor of the flash circuit FLC, and when the output terminal CHC of the flash circuit FLC is changed to the "High" level and accordingly completion of charging up of the flash capacitor is detected, the output terminals FLS, DTS of the microcomputer MC are both changed to the "High" level at step #66 in order to stop the boosting operation and the charging completion detecting operation of the flash circuit FLC. After then, the microcomputer MC stops its operation.

Now, operation of the microcomputer MC when the rear cover switch RCS is switched from the terminal CL to the other terminal OP or vice versa or when the front converter detecting switch FCS is switched from the open to the closed position or vice versa or otherwise when the trimming switch TRS is changed from the open to the closed position, will be described with reference to FIG. 11. In any of the instances described just above, an interrupt signal is received at the interrupt terminal INT₁ of the microcomputer MC.

In the routine illustrated in FIG. 11, at first at step #70, the output terminals FLS, DTS of the microcomputer MC are both changed to the "High" level in order to stop a boosting operation and a charging up completion detecting operation of the flash circuit FLC similarly as at step #1 of FIG. 10a. Then at step #71, it is judged whether or not the rear cover switch RCS is switched to the terminal CL. Then, in case the rear cover switch RCS is connected to the terminal CL at step #71, then the microcomputer MC checks, at step #72, a rear cover flag RCF which is set to "1" when the rear cover is closed but is reset to "0" when the rear cover is opened. If the flag RCF is "1" at step #72, this means that the rear cover has been and still remains in the closed position, and the program thus advances directly to step #90. To the contrary, if, at step #72, the rear cover flag RCF is "0", this means that the rear cover has been just brought into the closed position from the open position, and the program thus advances to step #73 at which the rear cover flag RCF is set to "1" and then to step #74 at which the output terminal WT of the microcomputer MC is changed to the "Low" level in order to rotate the motor M in the forward direction to effect a preliminary film feeding operation. Then at step #75, the microcomputer MC waits until the counter switch COS is turned on. Then after turning on of the counter switch COS, the microcomputer MC waits, at step #76, now until the one frame switch FPS is turned on. Then after turning on of the one frame switch FPS, the output terminal RWT of the microcomputer MC is changed at step #77 to the "Low" level in order to brake the motor MO, and then at step #78, the output terminals WT, RWT are both changed to the "High" level to stop operation of the motor driving circuit MD thereby to complete the preliminary film feeding operation. After then, the microcomputer MC enters the stop routine shown in FIG. 12.

On the other hand, if it is judged at step #71 that the rear cover switch RCS is connected to the terminal OP, then the microcomputer MC judges at step #80 whether or not the rear cover flag RCF is "1", and where the rear cover flag RCF is "0", this means that the rear cover has been and still remains in the open position, and the program thus advances to step #90. On the contrary if the rear cover flag RCF is "1" at step #80, this indicates that the rear cover has been just brought into the open position from the closed position. In this case, the rear cover flag RCF is reset to "0" at step #81, and then it is judged at step #82 whether or not the one frame switch FPS is on. Then, if the one frame switch FPS is on at step #82, the microcomputer MC immediately enters the stop routine. On the contrary if the one frame switch FPS is off at step #82, this means that winding of a film by one frame failed due to arrival of a final frame of the film and therefore rewinding of the film has been performed. Accordingly, in this case, the output terminal WT of the microcomputer MC is changed to the "Low" level in order to start a film winding operation at step #83. After then, the microcomputer MC advances the program to step #76 at which it waits until the one frame switch FPS turns on, and after turning on of the one frame switch FPS, the motor MO is braked against rotation and stopped at steps #77 and #78 in such a manner as described hereinabove, and then the microcomputer MC enters the stop routine.

Meanwhile, at step #90, the microcomputer MC judges whether or not the front converter detecting switch FCS is on, and when the switch FCS is on, the program advances to step #91 at which it is judged whether or not the front converter mounting detection flag FCF is "1". In case the front converter mounting detection flag FCF is "1", this indicates that the front converter has been and still remains mounted on the camera, and the program thus skips to step #98. To the contrary, in case the front converter mounting detection flag FCF is "0" at step #91, this means that the front converter has been newly mounted on the camera. In this case, the front converter mounting detection flag FCF is set to "1" at step #92, and then at step #93, the microcomputer MC instructs the liquid crystal display device 24 to display with the display pattern as shown in FIG. 8, and then enters the stop routine.

To the contrary, in case the front converter mounting switch FCS is off at step #90, the microcomputer MC judges at step #94 whether or not the front converter mounting detection flag FCF is "1", and if the flag FCF is "0", this indicates that the front converter is not yet mounted on the camera, and the microcomputer MC thus advances to step #98. On the contrary if the front converter mounting detection flag FCF is "1" at step #94, this means that the front converter has been just removed, and accordingly the flag FCF is reset to "0" at step #95. After then, the trimming flag TRF is also reset to "0" at step #96, whereafter the display pattern of FIG. 6 is displayed on the liquid crystal display device 24 at step #97.

The step #98 is reached when the trimming switch TRS has been switched from the open to the closed position. In this instance, it is first detected at step #98 whether or not the front converter detecting switch TRS is on. In case the switch FCS is on, the stop routine is immediately entered in order to maintain the trimming mode of the camera and the display pattern of FIG. 8 on the liquid crystal display device 24. On the contrary if the front converter detecting switch FCS is off at step #98, then it is determined at step #99 whether or not the trimming flag TRF is "1". If the flag TRF is "1" here, this indicates that the camera has been and still remains in the trimming mode and the display of the display pattern of FIG. 7 has been and is maintained on the camera, and the trimming flag TRF is thus reset to "0" at step #96 whereafter the display pattern of FIG. 6 for the normal mode is displayed on the liquid crystal display device 24 at step #97. On the other hand, if the trimming flag TRF is "0" at step #99, this indicates that the camera has been and still remains in the normal mode with the display pattern of FIG. 6 displayed on the liquid crystal display device 24, and the trimming flag TRF is thus set to "1" at step #100 whereafter the display pattern of FIG. 7 is now displayed on the liquid crystal display device 24 at displayed on the liquid crystal display device 24 at step #101.

It will be appreciated that while in the present embodiment the switch for detecting mounting of a front converter is located within the rear cover, it may otherwise be located within the camera body. Further, the present invention can be applied also to a camera of the type which allows only normal photographing using a photographing lens of a predetermined fixed focal length when a front converter is not mounted on the camera.

Having now fully described the invention, it will be apparent to one of ordinary skill in the art that many changes and modifications can be made thereto without departing from the spirit and scope of the invention as set forth herein.

What is claimed is:

1. A camera on which a front converter can be mounted, comprising:
   judging means for judging whether or not a front converter is mounted on said camera;
   trimming designating means for designating a trimming condition in which an area smaller than a normal photograph area is printed;
   encoding means operable in response to operation of said trimming designating means for encoding a trimming signal indicative of the trimming condition on a film; and
   controlling means operable when said judging means judges that a front converter is mounted on said camera for operating said trimming designating means to designate the trimming condition.

2. A camera as claimed in claim 1, wherein said controlling means determines, when said judging means judges that no front converter is mounted on said camera, whether or not said trimming designating means is to be operated in response to a set condition of a manually operable member.

* * * * *